United States Patent [19]

Taverner et al.

[11] Patent Number: 5,514,960
[45] Date of Patent: May 7, 1996

[54] ELECTROMAGNETIC DRIVE DEVICE HAVING A PLURALITY OF SINVSOIDAL COILS

[76] Inventors: Charles T. Taverner, 36 Partridge Run, Amherst, N.Y. 14228; Steven P. Sable, 7 Country View Ter., Brockport, N.Y. 14420-9705

[21] Appl. No.: 248,330

[22] Filed: May 24, 1994

[51] Int. Cl.⁶ .......................... G01R 11/30; G01R 1/20; H02K 37/00
[52] U.S. Cl. .................. 324/144; 324/207.25; 310/49 R; 310/156
[58] Field of Search .................................... 324/140, 144, 324/207.24, 207.25, 146; 310/49 R, 40 R, 156, 254, 257, 268, 162–165, 166, 68 B, 68 R, 12; 318/696, 685

[56] References Cited

U.S. PATENT DOCUMENTS

| | | | |
|---|---|---|---|
| 2,428,822 | 6/1945 | Kolff | 281/51 |
| 2,539,144 | 1/1951 | Kuhlmann | 310/164 |
| 2,805,677 | 9/1953 | Baird | 324/207.25 |
| 2,814,746 | 8/1954 | Boerdijk | 310/164 |
| 3,096,455 | 7/1963 | Hahn | 310/268 |
| 3,205,383 | 9/1965 | Hust | 310/162 |
| 3,219,862 | 11/1965 | Kieffert | 310/162 |
| 3,324,323 | 6/1967 | Henry-Baudot | 310/203 |
| 3,508,091 | 4/1970 | Kavanaugh | 310/49 R |
| 3,652,884 | 3/1972 | Vuffray | 310/156 |
| 3,719,845 | 3/1973 | Takeda | 310/268 |
| 3,737,697 | 6/1973 | Kitamori et al. | 310/207 |
| 3,783,313 | 1/1974 | Mathur | 310/49 R |
| 3,784,850 | 1/1974 | Inaba et al. | 310/49 R |
| 3,845,338 | 10/1974 | Fawzy | 310/154 |
| 4,125,792 | 11/1978 | Schneider | 310/268 |
| 4,181,884 | 1/1980 | Shirasaki et al. | 324/207.25 |
| 4,199,718 | 4/1980 | Ikeda et al. | 324/207.25 |
| 4,207,483 | 6/1980 | Baer | 310/49 R |
| 4,271,370 | 6/1981 | DiMeo | 310/266 |
| 4,340,833 | 7/1982 | Sudo et al. | 310/268 |
| 4,517,478 | 5/1985 | Oudet | 310/49 R |
| 4,545,117 | 10/1985 | Okamoto | 310/12 |
| 4,639,084 | 1/1987 | Kugioka | 310/49 R |
| 4,646,088 | 2/1987 | Inoue | 324/207.25 |
| 4,672,247 | 6/1987 | Madsen et al. | 310/49 R |
| 4,733,115 | 3/1988 | Barone et al. | 310/207 |
| 4,743,786 | 5/1988 | Ichikawa et al. | 310/111 |
| 4,922,145 | 5/1990 | Shtipleman | 310/49 R |
| 4,965,864 | 10/1990 | Roth et al. | 318/135 |
| 5,051,633 | 9/1991 | Tu et al. | 310/49 R |
| 5,150,115 | 9/1992 | DeJong et al. | 340/870.31 |
| 5,300,884 | 4/1994 | Maestre | 324/207.25 |

Primary Examiner—Sandra L. O'Shea
Assistant Examiner—Jay M. Patidar
Attorney, Agent, or Firm—Hodgson, Russ, Andrews, Woods & Goodyear

[57] ABSTRACT

An electromagnetic drive means for providing motion. An application is as an indicator device for registering the magnitude of an input supplied to a computer by an external sensor is described. The electromagnetic drive means includes a first stationary member that comprises electrically conductive material having a serpentine configuration that defines a plurality of alternating peaks and troughs which are selectively magnetized to provide alternating north and south magnetic fields. A second member is movable along the path of the stationary member by discrete and controlled magnetic attraction and repulsion forces set up between the members. The stationary members can be provided with a graduated scale while the movable member carries a pointer that is movable with respect to the scale to thereby indicate a magnitude of the input. A specific application of this indicator device is as a gauge in a dashboard.

27 Claims, 8 Drawing Sheets

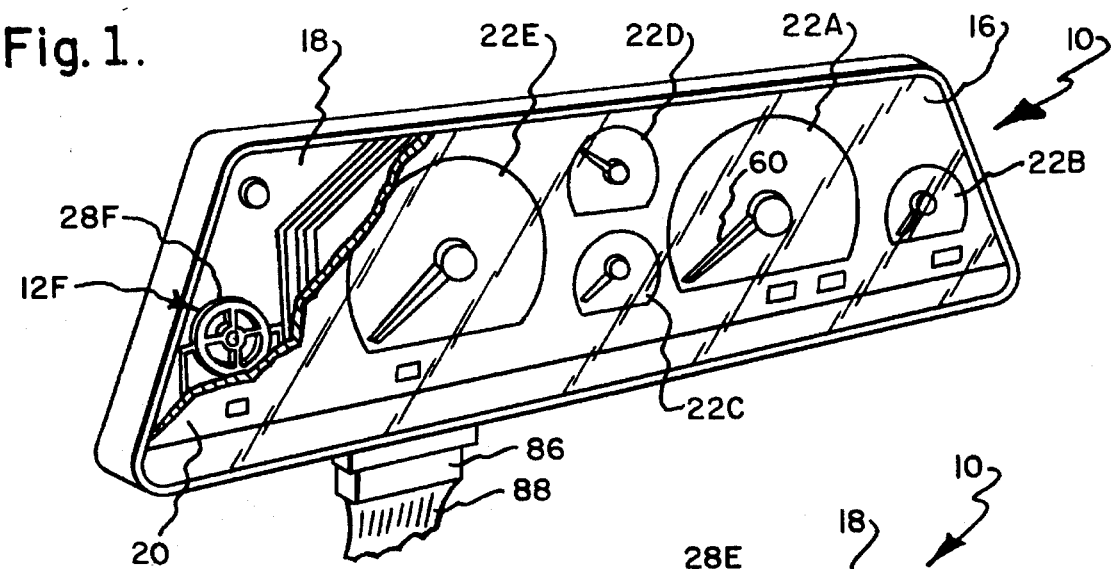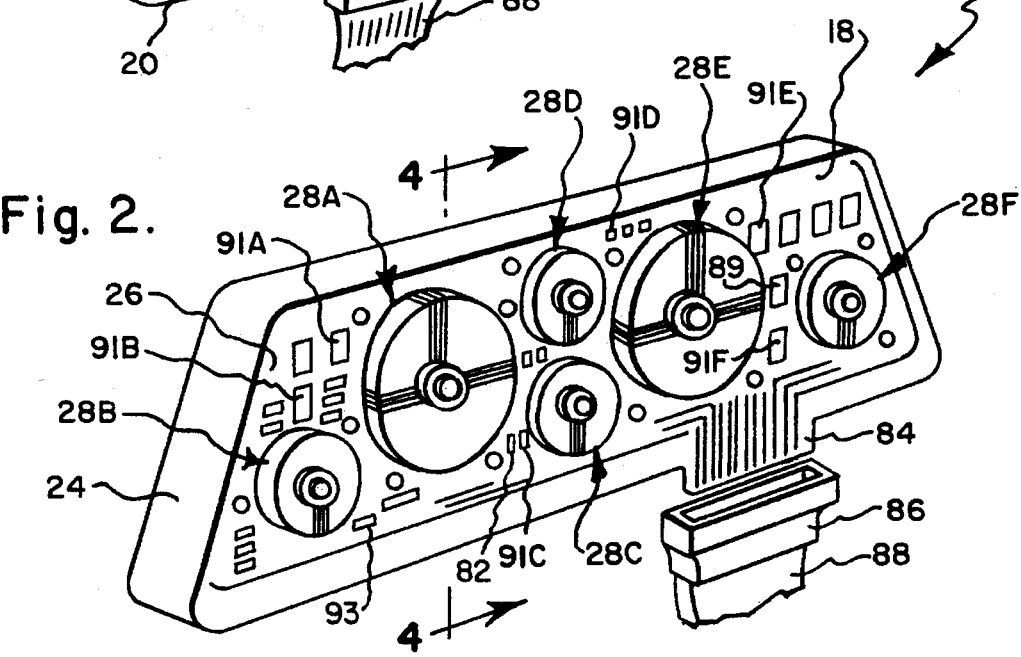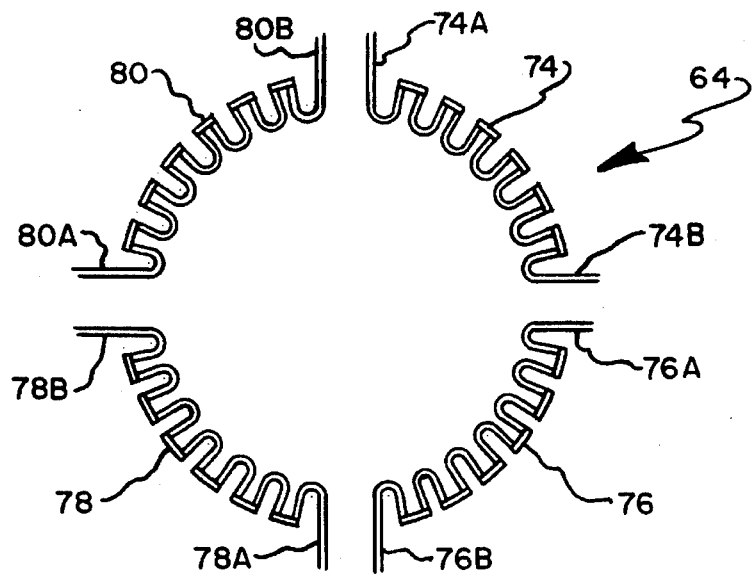

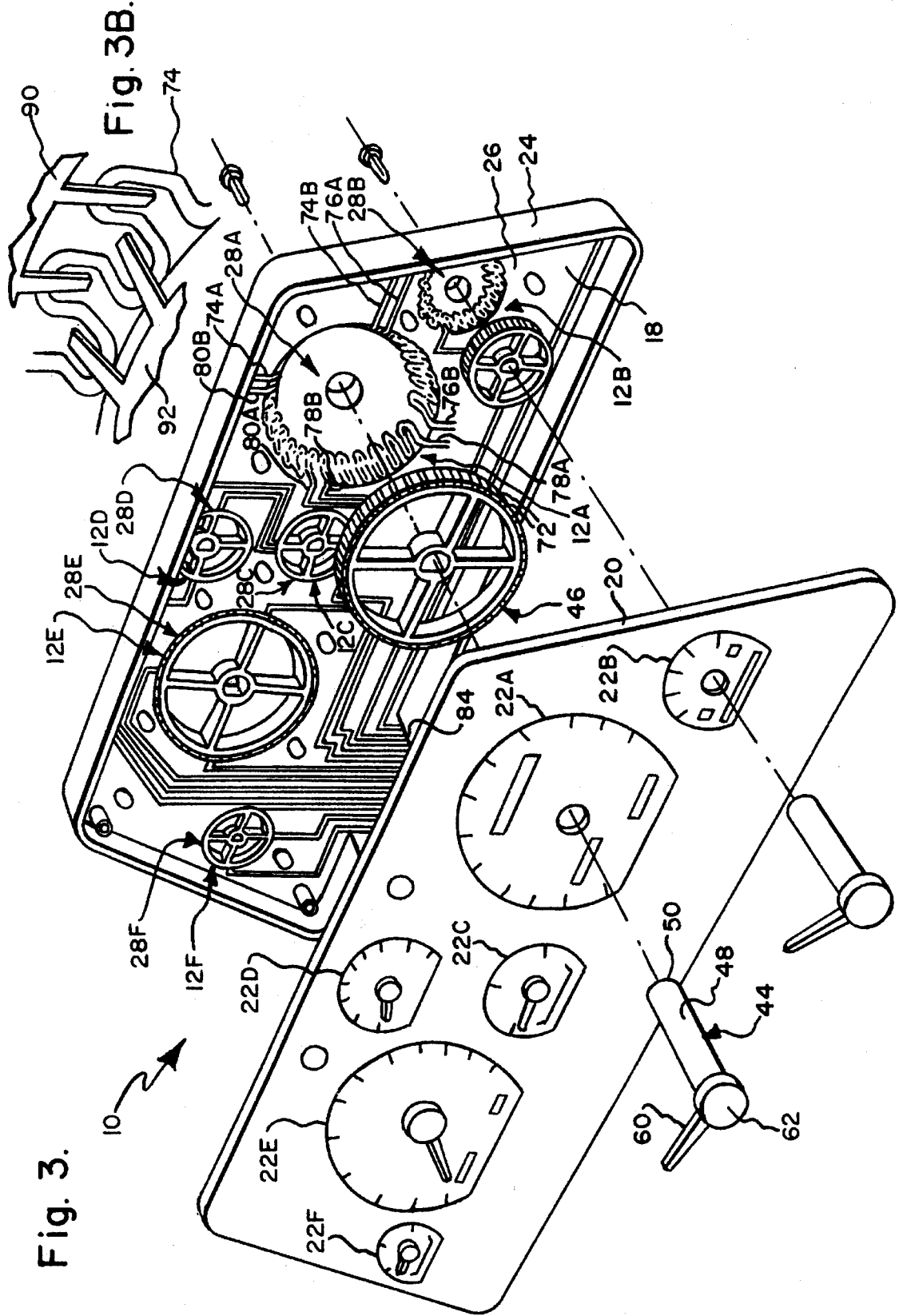

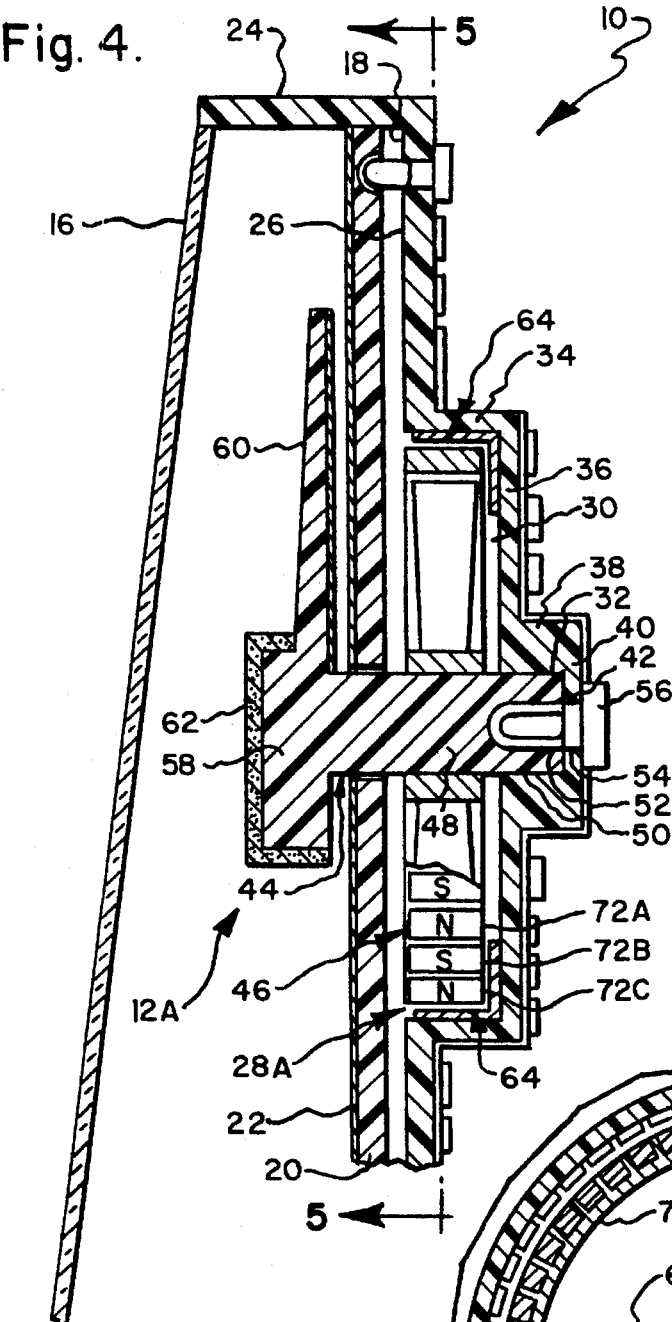
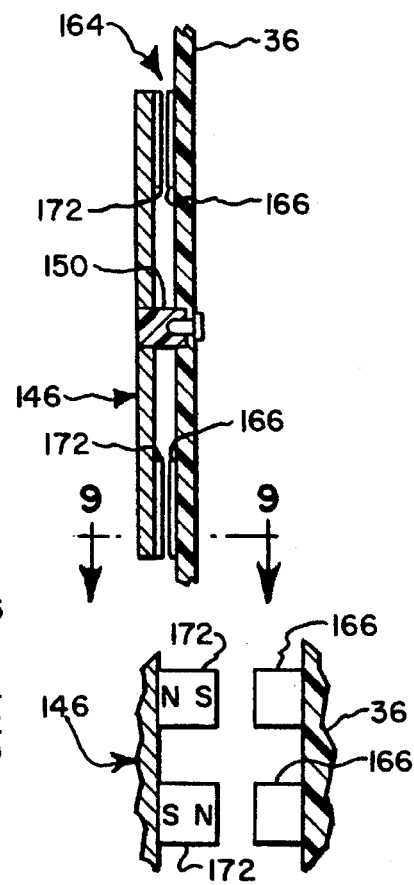
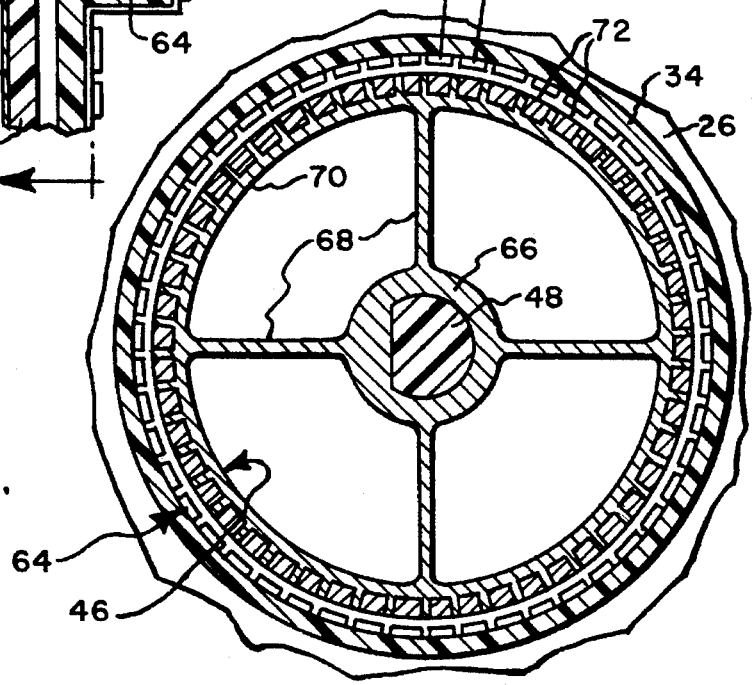
Fig. 4.
Fig. 8.
Fig. 9.
Fig. 5.

5,514,960

1

ELECTROMAGNETIC DRIVE DEVICE HAVING A PLURALITY OF SINVSOIDAL COILS

BACKGROUND OF THE INVENTION

1. Field of the Invention

The present invention relates to an electromagnetic drive device which can be used as an indicator device for registering the magnitude of a measurement. A plurality of indicator devices of the present invention are particularly useful as gauges and meters in a display panel, for example, of the kind used in an automobile instrument cluster fitted into a dashboard. Such gauges can include the speedometer, fuel gauge, tachometer, oil pressure gauge, alternator or charging gauge, and the like.

2. Prior Art

Currently, gauge movement in many analogue-type indicator devices of the kind typically used in an instrument cluster is provided by an air coil mechanism that drives a "pointer." This is well known to those skilled in the art. The pointer is a complex mechanism itself that must be dynamically balanced after assembly to conform to the low torque output of its associated air coil. The air coil is mounted in an instrument cluster housing and the housing is fitted into the dashboard. However, air coil movement suffers from gauge inaccuracy characterized by pointer drift, pointer imbalance (despite dynamic balancing), pointer stutter, non-linearity throughout the motion range, poor response time, return to zero problems, stop pin requirements and high power requirements.

SUMMARY OF THE INVENTION

The electromagnetic drive device of the present invention comprises a movable member and a stator member. The stator member is composed of an electrically conductive material having a generally serpentine configuration to define a plurality of selectively energizable peaks and troughs providing alternating magnetic fields along the stator. The movable member can be either a rotor for providing rotational output movement, a slider for providing linear output movement and a combination of the two. The movable member is moved relative to the stator and along the travel path thereof in response to discrete and controlled manipulation of the magnetic attractive and repulsion forces set up between the members.

When the electromagnetic drive device is used in an indicator device, the movable member can support a pointer while a housing for the stator member is provided with a graduated scale. Thus, the selectively controllable magnetic attraction and repulsion forces established between the stator and movable member provide for relative incremental movement of the pointer along the graduated scale. This movement is an extremely accurate indication of the magnitude of a measured parameter, which can be supplied to a controller for the selectively magnetizable stator member from an external input. The magnetically actuated movement provides movement in a linear or a rotary direction, or in a combination of the two.

More particularly, the electromagnetic drive device of the present invention used as an indicator device provides a precise output of a measurable parameter by means of magnetic attraction and repulsion forces established between a movable member and a stationary member. The first stationary member comprises a plurality of interrelated segments, each segment formed of an electrically conductive material having a serpentine type configuration that defines a plurality of alternating peaks and troughs along a sinuous path. Each segment is selectively energized to provide alternating north and south magnetic fields generated at the alternating peaks and troughs and along a travel path provided by the interrelated segments of the stationary member. The second member is movable along the travel path by discrete and controlled magnetic attraction and repulsion forces set up between the two members. The polarity of the fields of the first member are dictated by an external input into a control means which converts this input into current pulses and current direction to thereby control the energization of the first member in response to the magnitude of the input. The travel path provided by the first member preferably includes a graduated scale while the second member carries a pointer that is movable along the length of the graduated scale. The indicator device of the present invention then outputs the real time value of the parameter being supplied by the external input in an analogue-type presentation that is extremely precise.

One application for the electromagnetic drive device of the present invention is in an indicator device serving as a gauge component in a display panel, for example, the type of display panel provided as an instrument cluster in a dashboard. The instrument cluster can be included in a newly assembled automobile or supplied to the automobile industry after market. The resultant instrument cluster has a reduced dimension in the depth direction and is therefore able to be fitted in the appropriate cavity in the dashboard or otherwise attached to a vehicle in a similar manner as in conventional vehicle assembly, making a retrofit feasible.

BRIEF DESCRIPTION OF THE DRAWINGS

FIG. 1 is a front perspective view of an instrument cluster apparatus 10, including a plurality of indicator means 12A to 12F each incorporating an electromagnetic drive device of the present invention, and shown as an automobile instrument panel.

FIG. 2 is a rear perspective view of the instrument cluster apparatus 10 shown in FIG. 1.

FIG. 3 is an exploded view of the instrument cluster apparatus 10 shown in FIG. 1.

FIG. 3A is a plan view of a stator 64 forming part of the electromagnetic drive device for the indicator means 12A to 12F shown in FIG. 1.

FIG. 3B is an enlarged and partial view of the stator 64 shown in FIG. 3A with magnetic intensifiers 90 and 92 proximate and centered with the peaks and troughs of the coils to thereby concentrate the magnetic fields created when stator 64 is electrically energized.

FIG. 4 is a cross-sectional view along line 4—4 of FIG. 2.

FIG. 5 is a cross-sectional view along line 5—5 of FIG. 4.

FIG. 8 is a side elevational view of another embodiment of the rotor 146 and stator 164 of an electromagnetic drive device of the present invention.

FIG. 9 is a cross-sectional view along line 9—9 of FIG. 8.

DETAILED DESCRIPTION OF THE INVENTION

Figure 6A:
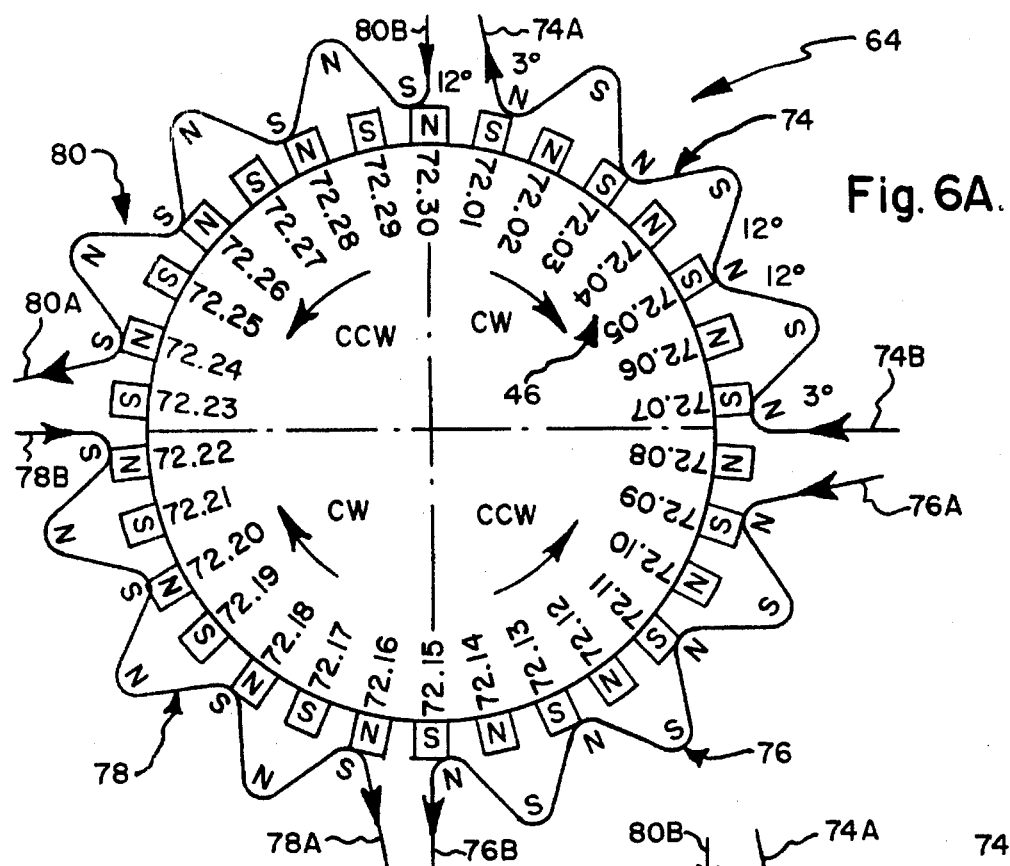
FIGS. 6A to 6F are sequential schematic views of an energized electromagnetic drive device of the present invention showing rotational movement of rotor 46 with respect to stator 64.

Referring now to the drawings, FIGS. 1 to 5 show an instrument cluster apparatus 10 comprising a plurality of electromagnetic drive devices of the present invention, each associated with respective indicator means designated as indicator means 12A to 12F. The indicator means include electromagnetic drive means according to the present invention that convert electrical energy into mechanical energy represented as discrete output movements. While the indicator means 12A to 12F shown provide for rotational output movement, it should be understood that the indicator means can also convert electrical pulses into discrete motion mn either a linear, a rotational or a combination thereof, and this will be explained in detail hereinafter.

The indicator means and associated electromagnetic drive means of the present invention are adapted for use in a display panel for indicating the magnitude of a measurable parameter supplied as an external input to a computer for controlling the drive means and thereby the indicator means. One application where the instrument cluster 10 is particularly useful is as a component in an automobile dashboard (not shown) and the like to indicate the magnitude of a measurable parameter such as vehicle speed, fuel level, engine temperature, voltage output and the like. It should be understood that while the indicator means and associated instrument cluster apparatus 10 of the present invention are particularly adapted for use in a display panel of the type used in the dashboard of an automobile, they should not be so limited. The inventors envision the present indicator means being used in a myriad of applications where analogue-type pointer devices are preferred to indicate the magnitude of a measurable parameter. Furthermore, the electromagnetic drive device of the present invention can find use in other applications for the rotational or linear output movement, or combinations thereof.

By way of example and not limitation, the instrument cluster apparatus 10 of the present invention will be described with respect to an automobile instrument panel (FIGS. 1 to 5, 8 and 9) that includes a cover 16 (FIGS. 1 and 4) joined to a back panel 18 which supports the plurality of electromagnetic drive means and associated indicator means 12A to 12F. A graphics panel 20 having dedicated indicia 22A to 22F thereon is provided at an intermediate position spaced between the cover 16 and adjacent to a front surface of back panel 18. Back panel 18 is preferably a non-conductive member sized to fit into a receiving cavity provided in an automobile dashboard (not shown) and the like.

As particularly shown in FIG. 3, back panel 18 comprises an outer framing wall 24 positioned normal to and in a surrounding relationship with an integral back wall 26 of panel 18. Back wall 26 is a generally planar portion having a plurality of indentations, indicated as indentations 28A to 28F (FIGS. 1 to 3) that are sized to house the respective drive means and associated indicator means 12A to 12F. The exact number and size of the indentations and therefore the size and number of the respective drive means and indicator means is governed by the particular function performed by each of the indicator means, and the number of indicator means shown in the figures is only illustrative, not limiting.

A representative indentation 28A is shown in cross-sectional detail in FIG. 4 and comprises a first annular recess 30 formed therein and a second annular recess 32 concentric with first recess 30 but having a smaller diameter. First recess 30 comprises a first annular side wall 34 joined to the back wall 26 of panel 18 in a normal orientation but extending in a direction parallel and opposite that of framing wall 24. First annular side wall 34 meets with a first end wall 36 which is parallel to back wall 26, and first end wall 36 in turn joins with a second annular side wall 38. Side wall 38 is concentric with first annular side wall 34 and joins with a second end wall 40 that is parallel with back wall 26 and end wall 36. Second end wall 40 is provided with a circular aperture 42, coaxial with the annular recesses 30 and 32.

Second annular recess 32 of indentation 28A rotatably receives a support member 44 for an associated rotor means 46 of the drive means for indicator means 12A. Rotor 46 will be described in detail hereinafter. Support 44 is preferably a molded member and includes a shaft 48 having a generally D-shaped cross-section (FIG. 5) tapering downwardly and inwardly along the longitudinal axis of shaft 48 to a journal end portion 50 thereof. The D-shaped cross-sectioned journal portion 50 is received in a rotatable relationship with the inner bearing surface of the second annular side wall 38 of indentation 12A.

An inlet 52 (FIG. 4) begins at the terminal end wall of journal portion 50 and extends axially along the longitudinal axis of shaft 48 a distance sufficient to receive a lamp 54 that provides for illumination of support 44. Lamp 54 comprises a bulb housed in inlet 52 and releasably mounted to a base 56 serving as an electrical connection to a power source (not shown) for lamp 54. Base 56 is snugly mated to aperture 42 and this structure enables lamp 54 to be detachably associated with the shaft 48 for replacing the bulb when it burns out.

Shaft 48 is formed of a light transmitting material such as acrylic or polycarbonate and extends from the journal portion 50 axially along recesses 30 and 32 to an enlarged head 58, circular in cross-section, provided at the opposite, proximal end of shaft 48. An intermediate pointer arm 60 extends outwardly from shaft 48, perpendicular to the longitudinal axis thereof such that arm 60 is proximate, but spaced from the indicia 22A provided on graphics panel 20 associated with indentation 28A. Head 58 supports a cover 62, preferably made of an opaque plastic material that is molded to head 58 as an integral member. With this construction, the light radiated by lamp 54 illuminates the shaft 48 and pointer arm 60 with cover 62 preventing the light from shining at a person positioned directly in front of the instrument panel.

As further shown in FIG. 4, first annular recess 30 of indentation 28A serves to house the electromagnetic drive device of indicator means 12A which comprises rotor 46 and a stator 64. Rotor 46 (FIG. 5) is made of a non-conductive material, such as a polymer, and comprises a centrally located hub 66 supporting a plurality of radially projecting spokes 68 connecting to a large diameter wheel 70, concentric with hub 66. Hub 66 has a generally D-shaped opening therethrough that receives the tapered shaft 48 of support 44 in a non-rotatable keyed fit while, as previously mentioned, the distal, journal portion 50 of shaft 48 is rotatably received in recess 32 of indentation 28A. Thus, the journal portion 50 turns or rotates with respect to the bearing surface provided by the side wall 38 of recess 32 to thereby provide for angularly rotating the pointer 60 and the associated rotor 46 with respect to stator 64 in a manner that will be explained in detail hereinafter.

Wheel 70 supports a plurality of permanent bar magnets 72 that are spaced at intervals around the periphery of wheel 70. Magnets 72 may be imbedded in the material comprising wheel 70 with their longitudinal axes parallel to the axis of shaft 48 and their outer surfaces flush with the outer peripheral surface of wheel 70, or magnets 72 may be mounted to wheel 70 in a topical construction. As shown in FIG. 4, magnets 72 are arranged having opposed contiguous portions of each magnet provided with either north or south magnetic polarities, such that for example, the south pole of magnet 72B is between the north poles of the two directly adjacent magnets 72A and 72C. This pattern of alternating poles for magnets 72 continues throughout the entire circumferential extent of wheel 70.

As shown in FIGS. 3, 3A and 3B, stator 64 is preferably comprised of a plurality of sequential coil sections 74 to 80, each having a generally serpentine shape. The coil sections 74 to 80 are composed of an electrically conductive material imbedded into a nonconductive material, such as a polymer, comprising the first recess 30 of indentation 28A, or the conductive material can be provided in a topical construction. Thus, stator coils 74 to 80 wind in a sinuous path extending along the first annular side wall 34 and that portion of end wall 36 directly adjacent to side wall 34. The serpentine type configuration of the stator coils 74 to 80 thereby defines a plurality of alternating peaks and troughs providing a frequency designated by the distance "x", as shown in FIG. 5, between the apex of immediately adjacent peaks or troughs extending along the path of the wind. Each peak and trough has an amplitude of displacement of equal and opposite magnitude spaced from the junction of side wall 34 and end wall 36.

FIGS. 8 and 9 show another embodiment of a rotor 146 and stator 164 comprising an electromagnetic drive device for an indicator means of the present invention. Rotor 146 is shown in a side elevational view in FIG. 8 and is a planar member having a circular shape supporting a plurality of magnets 172, spaced at equal intervals around the periphery thereof. As shown in FIG. 9 magnets 172 are formed having opposed contiguous portions of each magnet provided with either north or south magnetic polarities and configured in an alternating pattern, similar to that previously described for magnets.

Stator 164 is comprised of a plurality of sequential coil sections similar to coil sections 74 to 80 of stator 64. However, the serpentine winds of electrically conductive material 166 of the coil sections of stator 164 are provided in a single plane, parallel to and proximally spaced from the magnets 172 of rotor 146. In that respect, rotor 146 pivots about an axis provided by a shaft 150 in response to selectively controllable magnetic attraction and repulsion forces established between stator 164 and rotor 146, in a similar manner as that which causes relative movement between rotor 46 and stator 64. This will be explained in detail presently.

As shown in FIGS. 3 and 3A related to indicator means 12A and in respect to the orientational reference of these figures, stator coil section 74 has a first conductor lead 74A provided on back wall 26 beginning a short distance clockwise after the 12:00 o'clock position of recess 30 and winding in a serpentine manner along the side wall 34 and end wall 36 to a second conductor lead 74B running along the back wall 26, a short distance clockwise before the 3:00 o'clock position of recess 30. Second coil section 76 is similar in configuration to first stator coil section 74 and has a first conductor lead 76A provided on back wall 26 beginning a short distance clockwise after the 3:00 o'clock position of recess 30 and winding in a serpentine manner along the side wall 34 and end wall 36 to a second conductor lead 76B. Second lead 76B of second section 76 runs along the back wall 26 and leaves section 76 spaced a short distance clockwise before the 6:00 o'clock position of recess 30.

A first conductor lead 78A of the third stator coil section 78 runs along back wall 26 and meets with the serpentine type windings comprising section 78 beginning a short distance clockwise after the 6:00 o'clock position of recess 30. Third coil section 78 then winds in a serpentine manner along the side wall 34 and end wall 36 to its second conductor lead 78B running along the back wall 26, spaced a short distance clockwise before the 9:00 o'clock position of recess 30. Finally, a first conductor lead 80A of the fourth stator coil section 80 runs along back wall 26 and meets with the serpentine type windings comprising the fourth section 80 beginning a short distance clockwise after the 9:00 o'clock position of recess 30. The fourth stator coil section 80 then winds in a serpentine manner along sidewall 34 and end wall 36 to its second conductor lead 80B which runs along the back wall 26, spaced a short distance clockwise before the 12:00 o'clock position of recess 30.

From this configuration, it can readily be seen that the first lead 74A of the first section 74 and the second lead 80B of the fourth section 80 are on opposite sides of the 12:00 o'clock position; the first lead 76A of the second section 76 and the second lead 74B of the first section 74 are on opposite sides of the 3:00 o'clock position; the first lead 78A of the third section 78 and the second lead 76B of the second section 76 are on opposite sides of the 6:00 o'clock position; and the first lead 80A of the fourth section 80 and the second lead 78B of the third section 78 are on opposite sides of the 9:00 o'clock position.

As shown in FIG. 3, the conductor leads 74A, 74B, 76A, 76B, 78A, 78B, 80A and 80B leave the coil sections 74 to 80 comprising stator 64 and run along back wall 26 of back panel 18 to group with other similar conductor leads from indicator means 12B to 12F in framing wall 24. Leads 74A, 74B, 76A, 76B, 78A, 78B, 80A and 80B of indicator means 12A are connected to an energizer means, indicated at 82 on panel 18 that is provided to selectively supply electrical current to the plurality of discrete coil means comprising stator means 64 to thereby create alternating north and south magnetic fields in either the peaks and troughs of the coil means in a manner which will be described in detail presently. Energizer means 82 (FIG. 2) also performs a similar function for the leads comprising indicator means 12B to 12F. An example of a energizer is Texas Instruments part no. TMS-370.

The plurality of conductor leads of the indicator means 12A to 12F also connect to a bus 84 (FIG. 2) that mates with a bus connector 86 (FIGS. 1 and 2) supporting a transmission cable 88 which supplies power and signal inputs to a dedicated driver means 91A to 91F for each of the respective indicator means 12A to 12F. An example of a driver is Motorola part no. MC 3499. The dedicated driver means 91A for indicator means 12A regulates the direction of current flow supplied to each of the coil sections 74 to 80 of stator 64 in response to a control input from a computer 93. The computer 93, which may be mounted on the panel 18, or at some other location, similarly sends and receives electrical pulses to the various driver means 91B to 91F of the electromagnetic drive means comprising the other indicator means 12B to 12F to thereby control energization of their respective stators. As will be explained in detail presently, the electromagnetic drive means then convert these electrical pulses into mechanical energy to thereby provide for rotational movement of the respective rotors. This is useful for indicating to a person viewing the indicator means, for example an occupant of an automobile, a parameter being measured by a sensor inputting the magnitude of the parameter to the computer 93. The indicator device can be, for example, a tachometer with the sensor being a device for indicating the speed of rotation of the crankshaft of an automobile. A myriad of other measurements can be input into the computer by various sensor instruments with the magnitude of the measurement being output in an analogue-type manner by the indicator device of the present invention. The kinds of instruments that are useful with the present indicator device are only limited by the engineering skill and imagination of the practitioner.

Accordingly, computer 93 comprises control means which provides a string of pulses to the drive means 91A for indicator means 12A that in turn converts the pulses into selectivity in switching the direction of current flow in the plurality of coil sections 74 to 80. The relationship of the direction of the current flow in each of the plurality of coil means is determinative of the magnetic attraction and repulsion forces established by the interaction between the magnet means 72 and the alternating north and south magnetic fields in either the peaks or troughs of the coil means. Coordination of the sequencing of change in current flow in the plurality of coil means causes movement of the rotor means 46 with respect to the stator means 64 by appropriate change in the magnetic attraction and repulsion forces established between the stator means and the magnet means of the rotor means along the travel path of the stator means which movement is indicative of a property of the control input.

Thus, rotational or angular movement of pointer arm 60 comprising part of the support 44 for the rotor 46 is controlled by selectively energizing the various coil sections 74 to 80 comprising stator 64. This causes the various peaks and troughs formed by the sinuous path of the coil sections to establish either north or south magnetic fields depending on the direction of current flow through the electrically conductive material comprising the coil sections. The magnetic fields in turn cause rotational movement of rotor 46 due to the magnetically attractive and repulsive forces set up between the alternating magnets 72 and the stator 64. This is illustrated in FIGS. 6A to 6H which are schematic representations of an exemplary rotor 46 and stator 64, and are presented to show the rotational movement of rotor 46 with respect to the coil sections 74 to 80 comprising stator 64.

The exact number of bar magnets 72 and the number of peaks and troughs of the coils sections 74 to 80 in FIGS. 6A to 6H is not meant to be limiting, and the inventors envision that the number of magnets 72 and the frequency of peaks and troughs in coil sections 74 to 80 can be varied by one of ordinary skill in the art without departing from the scope and spirit of the present invention. In that respect, in FIGS. 6A to 6F rotor 46 comprises a plurality of magnets 72, indicated as magnets 72.01 to 72.30 spaced at equal intervals of 12 degrees around the periphery of wheel 70. In practice, there will generally be a greater quantity of magnets spaced at closer intervals than the magnets 72 shown. For the sake of clarity only one of the poles of each of the magnets is shown. Also for illustration purposes, the frequency between adjacent peaks or troughs defined by stator 64 has been expanded from that which is actually contemplated to be used in practice. There are 24 degrees between adjacent peaks or troughs with a 12 degree offset between the adjacent electrical leads for consecutive coil sections and 3 degrees between the first and last trough in a section and its adjacent electrical lead. As an example, in practice the frequency between adjacent peaks or troughs is contemplated to be 4 degrees with a 1 degree offset between adjacent electrical leads for consecutive coil sections. In addition, with respect to the illustrations of FIGS. 6A–6F the troughs of the winding of stator 64 are those portions closest to rotor structure 46 and the peaks of stator 64 are the farthest from rotor 46. Thus, it should be understood that the angular offset between each of the pairs of adjacent leads is similar and is preferably a fraction of the frequency of the wind of the coil sections 74 to 80. Preferably the frequency is a multiple of the angular offset between adjacent leads, which multiple is directly related to the number of coil sections. However, while four coil sections 74 to 80 are shown in this embodiment, the present invention should not be so limited. Neither do the coil sections need to completely circle the stator means.

Referring now in detail to FIGS. 6A–6F, as shown in FIG. 6A, current flow initially enters coil section 74 through second lead 74B and exits through first lead 74A. This sets up magnetic north fields in the troughs and magnetic south fields in the peaks of the sinuous path of coil section 74. Current flow initially enters coil section 76 through lead 76A and exits through second lead 76B. This sets up magnetic north fields in the troughs and magnetic south fields in the peaks of section 76. Current flow in coil section 78 enters through lead 78B and exits through lead 78A, which sets up magnetic north fields in the troughs and magnetic south fields in the peaks of section 78. Finally, current flow in coil section 80 enters through lead 80B and exits through lead 80A which sets up magnetic south fields in the troughs and magnetic north fields in the peaks of section 80.

With the rotor 64 initially positioned as shown in FIG. 6A, it can be seen that the south poles of bar magnets 72.01, 72.03, 72.05 and 72.07 are magnetically attracted in a clockwise direction to the magnetic north fields set up in the troughs of stator section 74. These magnets are offset counterclockwise from direct alignment with the magnetic north fields in section 74 by 3 degrees in this example. Rotor magnets 72.09, 72.11, 72.13 and 72.15 are magnetically attracted in a counterclockwise direction to the magnetic north fields set up in the troughs of stator section 76, offset from direct alignment in a clockwise direction by 3 degrees. Magnets 72.16, 72.18, 72.20 and 72.22 are magnetically attracted in a clockwise direction to the magnetic south fields set up in the troughs of section 78, offset 3 degrees in the counterclockwise direction. And, magnets 72.24, 72.26, 72.28 and 72.30 are magnetically attracted in a counterclockwise direction to the magnetic south fields set up in the troughs of section 80, offset 3 degrees in the clockwise direction. Thus, it can be seen that rotor 46 is magnetically locked in position by opposite and equal in magnitude attraction between its magnets 72 and sections 74, 78 tending to magnetically attract rotor 46 in a clockwise direction and sections 76,80 which tend to magnetically attract rotor 46 in a counterclockwise direction, but of a magnetic force equal and opposite in direction as that of sections 74, 78. For purposes of reference, magnet 72.01 is aligned 3 degrees counterclockwise to the first trough of coil 74 directly adjacent to lead 74A.

Figure 6B:
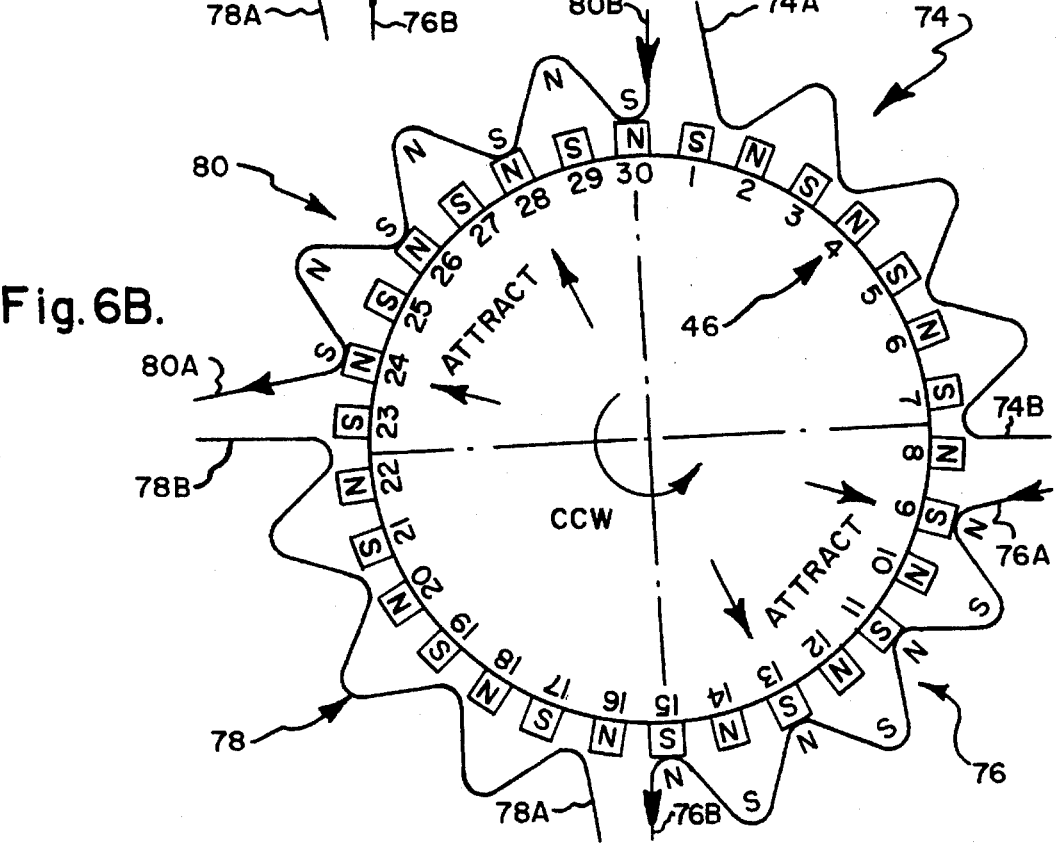

In FIG. 6B, the electrical current in stator sections 74 and 78 has been turned off and the direction of current flow in sections 76 and 80 remains the same as that shown in FIG. 6A. This maintains the magnetic north fields in the troughs of section 76 and the magnetic south fields in the troughs of section 80, and causes the rotor 46 to move 3 degrees in a counterclockwise direction. Magnets 72.09, 72.11, 72.13 and 72.15 are now in direct magnetic attraction with the magnetic north fields in section 76 and magnets 72.24, 72.26, 72.28 and 72.30 are in direct magnetic attraction with the magnetic south fields in section 80. Reference magnet 72.01 has rotated 3 degrees in a counterclockwise direction and is now aligned 6 degrees counterclockwise with respect to the first trough of coil 74, directly adjacent to lead 74A.

If it is desired to move rotor 46 in a clockwise direction from the position shown in FIG. 6B back to that shown in FIG. 6A, current flow is again established in sections 74 and 76 similar to that shown in FIG. 6A. This reestablishes the state of equal magnetic attraction between magnets 72 and section 74, 78 tending to magnetically attract rotor 46 in a clockwise direction and sections 76,80 which tend to magnetically attract rotor 46 in a counterclockwise direction, but of a magnetic force equal in magnitude and opposite in direction to that of sections 74, 78.

Further movement of rotor 46 in the counterclockwise direction is caused by turning on the current in stator sections 74 and 78 and changing the direction of the current flow in sections 74 and 78 from that which is shown in FIG. 6A to establish magnetic south fields in the troughs of section 74 and magnetic north fields in the troughs of section 78. The direction of current flow in sections 76 and 80 remains the same as that shown in FIG. 6B. Then, magnets 72.02, 72.04, 72.06 and 72.08 are magnetically attracted in a counterclockwise direction to the magnetic south fields in section 74, offset clockwise 3 degrees; bar magnets 72.09, 72.11, 72.13 and 72.15 are magnetically attracted in a clockwise direction to the magnetic north fields in section 76, offset 3 degrees in the counterclockwise direction; magnets 72.17, 72.19, 72.21 and 72.23 are magnetically attracted in a counterclockwise direction to the magnetic north fields in section 78, offset 3 degrees in the clockwise direction; and magnets 72.24, 72.26, 72.28 and 72.30 are magnetically attracted in a counterclockwise direction to the magnetic south fields in section 80, offset 3 degrees in the clockwise direction. This configuration magnetically locks rotor 46 in the position shown in FIG. 6C with sections 74 and 78 attracting the magnets of rotor 46 in a counterclockwise direction and sections 76 and 80 attracting the magnets of rotor 46 in a clockwise direction, but with a force equal in magnitude and opposite in direction as the magnetic forces set up between sections 74 and 78 and rotor 46. Reference magnet 72.01 is now offset 9 degrees counterclockwise with respect to the first trough of coil 74 directly adjacent to lead 74A.

Figure 6C:
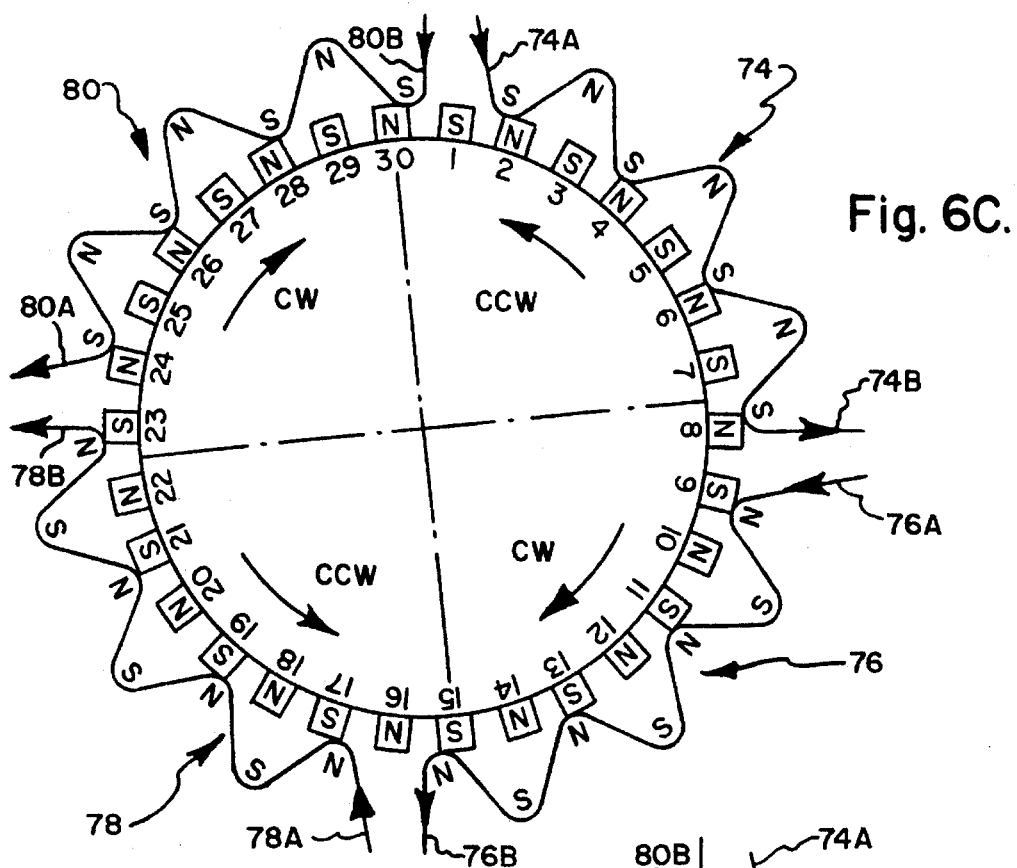

To return rotor 46 to the position shown in FIG. 6B from that shown in FIG. 6C, it is necessary to discontinue current flow in sections 74 and 78 and thereby reestablished the current scheme of that figure. This causes rotor 46 to rotate 3 degrees in a clockwise direction back to the position shown in FIG. 6B.

Figure 6D:
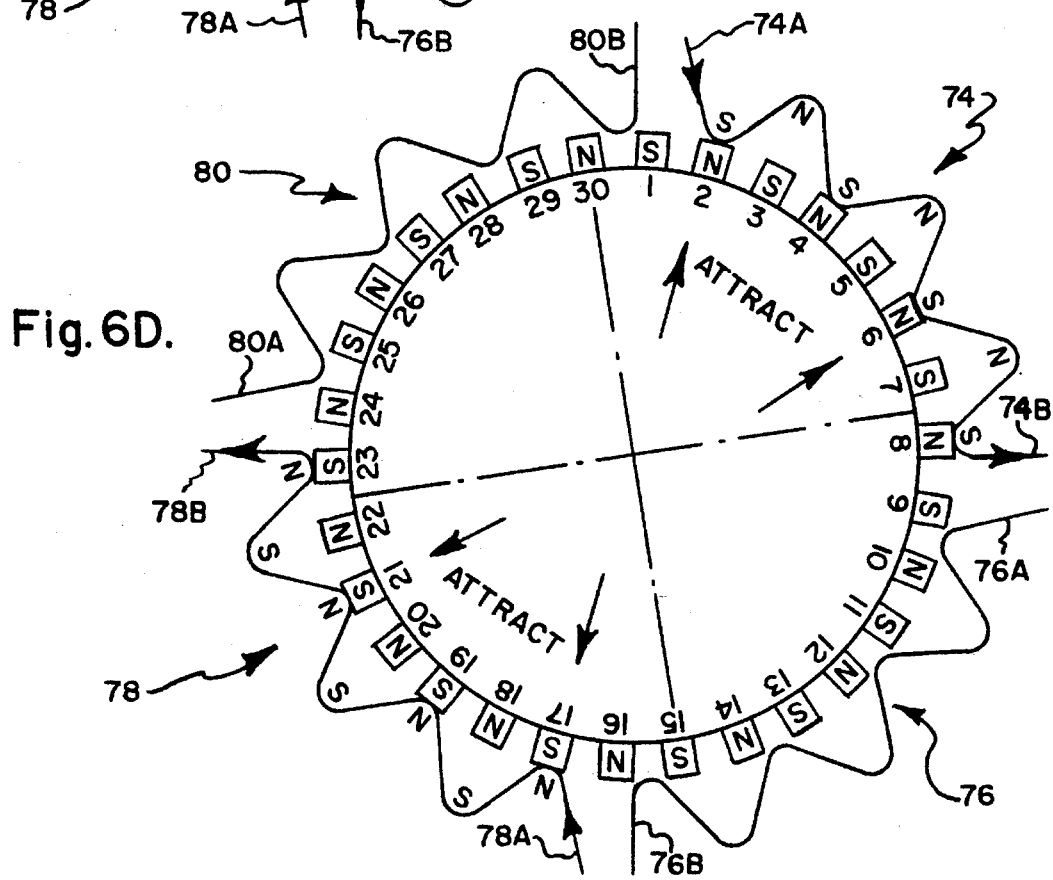

In FIG. 6D, there is no current flow in sections 76 and 80 and the current flow in sections 74 and 78 remains the same as that shown in FIG. 6C. This maintains the magnetic south fields in the troughs of section 74 and the magnetic north fields in the troughs of section 78. Magnets 72.02, 72.04, 72.06 and 72.08 are in direct magnetic attraction with the magnetic south fields in section 74, while magnets 72.17, 72.19, 72.21 and 72.23 are in direct magnetic attraction with the magnetic north fields in section 78. Thus, rotor 46 has further rotated 3 degrees in a counterclockwise direction from that shown with respect to FIG. 6C. Reference magnet 72.01 is now offset 12 degrees counterclockwise with respect to the first trough of coil 74 directly adjacent to lead 74A, or 6 degrees clockwise with respect to the first trough of section 80 directly adjacent to lead 80B.

To return rotor 46 to the position shown in FIG. 6C, it is necessary to reestablish current flow in sections 76 and 80 to that which is shown in that figure. This cause rotor 46 to rotate 3 degrees in a clockwise direction back to the position shown in FIG. 6C.

Figure 6E:
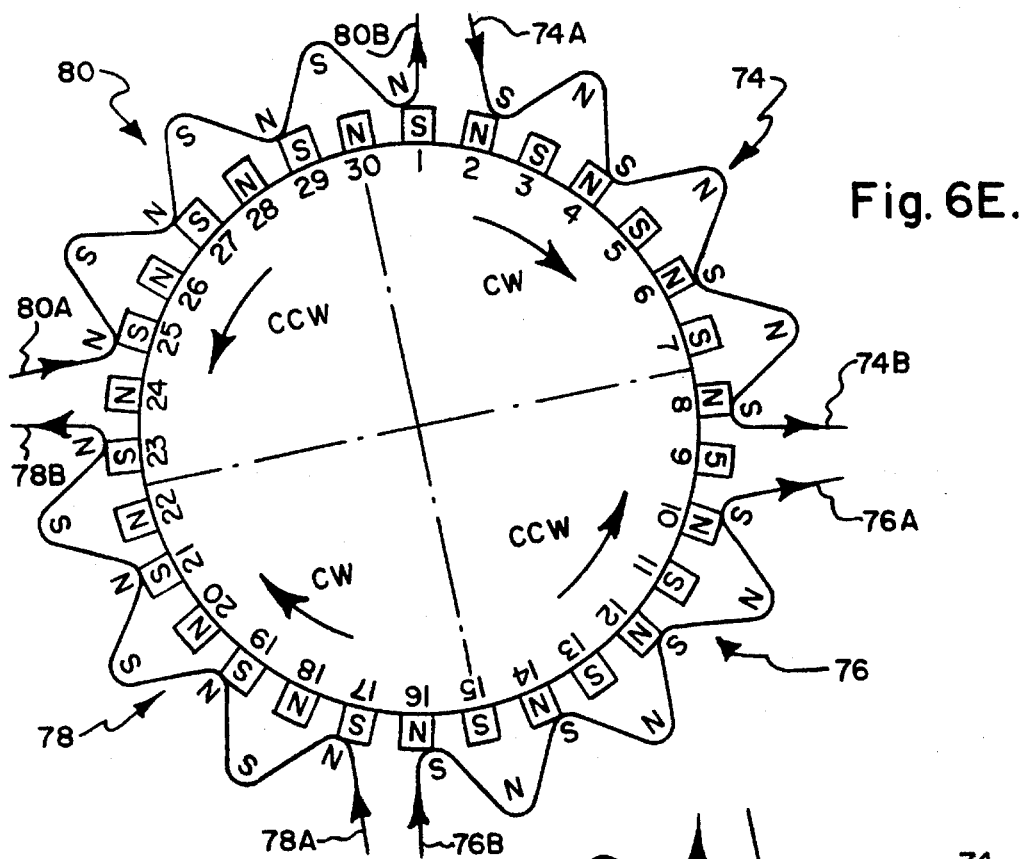

In FIG. 6E, the direction of the current flow in sections 74 and 78 remains the same as that shown in FIG. 6D and the direction of the current flow in sections 76 and 80 is opposite that shown for those sections in FIG. 6C. This establishes magnetic south fields in the troughs of section 76 and magnetic north fields in the troughs of section 80. Thus, magnets 72.02, 72.04, 72.06 and 72.08 are magnetically attracted in a clockwise direction to the magnetic south fields in section 74, offset 3 degrees in a counterclockwise direction; magnets 72.10, 72.12, 72.14 and 72.16 are magnetically attracted in a counterclockwise direction to the magnetic south fields in section 76, offset 3 degrees in a clockwise direction; magnets 72.17, 72.19, 72.21 and 72.23 are magnetically attracted in a clockwise direction to the magnetic north fields in the troughs of section 78, offset 3 degrees in a counterclockwise direction; and magnets 72.25, 72.27, 72.29 and 72.01 are magnetically attracted to the magnetic north fields in section 80, offset 3 degrees in a clockwise direction. Thus, those magnets 72 comprising rotor 46 which are operatively associated with stator sections 74 and 78 are magnetically attracted to their adjacent magnetic fields in a clockwise direction, while those magnets 72 of rotor 46 operatively associated with stator sections 76 and 80 are attracted in a counterclockwise direction by a magnetic force which is equal in magnitude but opposite in direction as that attracting those magnets associated with stator sections 74 and 78. This provides for locking the rotor 46 in the position shown in FIG. 6E with reference magnet 72.01 now offset 3 degrees clockwise from the first trough of section 80 directly adjacent to lead 80B.

To return rotor 46 to the position shown in FIG. 6D, it is necessary to discontinue current flow in sections 76 and 80 and thereby reestablish the current scheme of that figure. This causes rotor 46 to rotate 3 degrees in a clockwise direction back to the position shown in FIG. 6D.

Figure 6F:
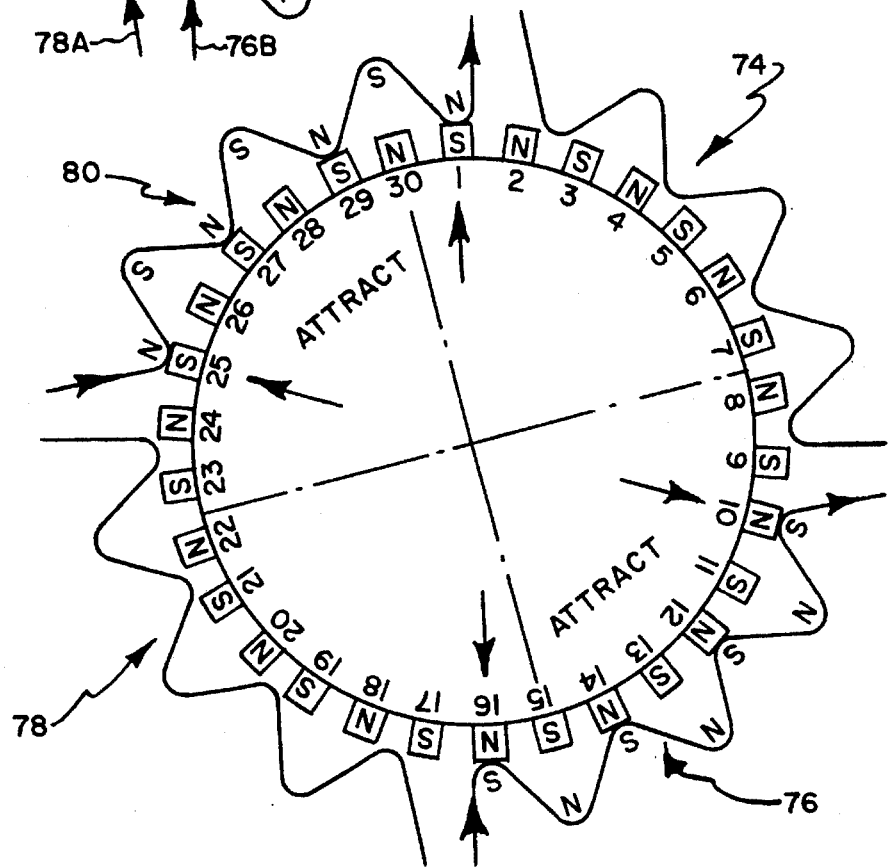

Finally, in FIG. 6F, there is no current flow in sections 74 and 78 and the current flow in sections 76 and 80 is in the same direction as that shown in FIG. 6E. Thus, magnets 72.10, 72.12, 72.14 and 72.16 are in direct magnetic attraction with the magnetic south fields in section 76 and magnets 72.25, 72.27, 72.29 and 72.01 are in direct magnetic attraction with the magnetic north fields in section 80. This provides for magnetically locking rotor 46 in the position shown in FIG. 6F with reference magnet 72.01 further rotated 3 degrees in a counterclockwise direction to align with the first trough in section 80 directly adjacent to lead 80B. Of course, if it is desired to rotate rotor 46 in a clockwise direction back to the position shown in FIG. 6E, the direction of current flow in sections 74 and 78 is again established similar to that shown in FIG. 6E. This reestablishes the state of equal and opposite magnetic attraction between coil sections 74, 78 and rotor 46 attracting in the clockwise direction and sections 76, 80 attracting in the counterclockwise direction.

In this manner, it can be seen that the direction and relative relationship of the current flow in the various coils is determinative of the magnetic attraction and repulsion forces established between rotor 46 and the coil sections 74 to 80 comprising stator 64, and that by coordinating the sequence of change of the current flow in the various sections, rotor 46 is rotatable to a particular angular position with respect to the coil sections 74 to 80 to thereby move the associated pointer 60 (FIGS. 1, 3 and 4). In the foregoing operation, current is supplied to coil sections 74 to 80 by energizer means 82 under control of the computer means 93. This is a very accurate and stable method of indicating in an analogue-type manner the magnitude of a measurement. Thus, rotational movement for rotor 46 and its associated pointer 60 can be either in a clockwise or a counterclockwise direction and the particular position for pointer 60 so attained can be locked by maintaining the current flow at a steady state.

As shown in FIG. 3B, the rotational function of rotor 46 with respect to stator coil sections 74 to 80 can be enhanced by providing flux intensifiers 90 and 92 proximate and aligned with the peaks and troughs of the coil sections 74 to 80. Intensifiers 90, 92 are comb-shaped members made of a magnetizable material and they serve to concentrate the flux pattern and therefore the magnetic field at the apex of the peaks or troughs. This aids in magnetic attraction and repulsion forces set up between the magnets 72 and the coil sections 74 to 80 to thereby enhance the above described rotational movement.

As shown schematically in FIGS. 7A to 7H, the magnetic attraction and repulsion forces used to provide angular movement of rotor 46 with respect to stator 64 can also be used to move a slide 94 in a linear direction along the length of a track provided between individual linear coil sections 100 and 102. Slide 94 is a unitary member comprising a plurality of magnets 96 imbedded in a non-conductive material, such as a polymer and spaced at intervals along the length of slide 94, or magnets 96 may be mounted in a topical construction. For illustrative purposes, slide 94 is shown comprised of magnets 96.1 to 96.6 with magnet 96.1 comprised of opposed upper and lower magnetic north poles, magnet 96.2 comprised of opposed upper and lower magnetic south poles, magnet 96.3 comprised of opposed upper and lower magnetic north poles, etc. The coil sections 100, 102 are comprised of electrically conductive material that is imbedded into a non-conductive housing (not shown), or which can be provided in a topical construction. In any event, coils 100, 102 have a serpentine wind that provide alternating peaks and troughs along a sinuous path. That way, when one of the sections 100, 102 is energized with a current flow through the conductive material comprising the sections 100, 102, magnetic north fields and magnetic south fields are set up in the troughs and peaks depending on the direction of the current flow. In the illustrative arrangements of FIGS. 7A to 7H, the peaks of stator coil sections 100, 102 are the uppermost portions of sections 100, 102 as viewed in FIGS. 7A to 7H, and the troughs are the lowermost portions of sections 100, 102 as viewed in FIGS. 7A to 7H. Although not shown, slide 94 can be provided with an associated pointer that coacts with a graduated scale (not shown) provided on the housing for coils 100, 102 to thereby indicate in a linear presentation the magnitude of a measured parameter, similar to that which has been previously described in detail for the rotor indicator means 12.

Figure 7A:
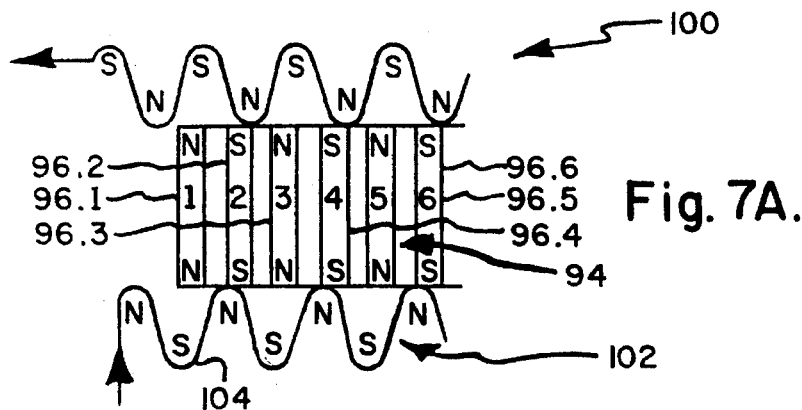
FIGS. 7A to 7H are sequential schematic views of an energized electromagnetic drive device of the present invention showing linear movement of a slide 94 with respect to a stator formed by coil sections 100 and 102.

In FIGS. 7A to 7H, sections 100 and 102 are provided with similar frequencies. However, the frequency of section 102 is offset 90 degrees with respect to section 100, and magnets 96 are spaced apart a distance equal to 180 degrees of the frequency of the coil sections 100, 102. In FIG. 7A, with the current flowing from right to left in section 100 as shown in the orientation of the drawing, magnetic north fields are set up in the troughs and magnetic south fields are set up in the peaks of coil 100. And, with the current flowing from left to right in section 102, magnetic south fields are set up in the troughs and magnetic north fields are set up in the peaks of this section. Then, the upper south poles of magnets 96.2, 96.4 and 96.6 are magnetically attracted towards the right by the magnetic north fields set up in the troughs of coil 100, while the lower magnetic south poles in these same bar magnets are magnetically attracted towards the left by the magnetic north fields set up in the peaks of section 102. This equal and opposite magnetic attraction locks slide 94 in the static position shown in FIG. 7A.

Figure 7B:
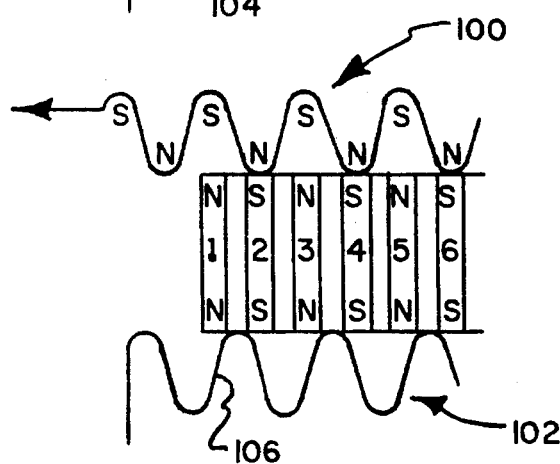

To move slide 94 towards the right, the direction of the current flow in section 100 remains the same as that shown in FIG. 7A and there is no current in section 102. Then, the upper south poles of magnets 96.2, 96.4 and 96.6 are in a state of direct magnetic attraction with the magnetic north fields set up in the troughs of section 100. This is shown in FIG. 7B and results in slide 94 having moved 45 degrees to the right along the frequency of coil sections 100, 102. This movement can be seen by focusing on any one of the magnets, for example, magnet 96.1 aligned with the 135 degree position of coil 102 in FIG. 7A, as indicated by point 104 on coil 102 and the 180 degree position, as indicated by point 106 with respect to the same coil as shown in FIG. 7B.

To return slide 94 to the position shown in FIG. 7A, it is necessary to reestablish the static position of slide 94 between sections 100 and 102 by having current flow in section 102 in a similar direction as shown in FIG. 7A. This causes slide 94 to move 45 degrees to the left along the frequency of coil sections 100, 102 to thereby align with the 135 degree position of coil 102 indicated by point 104.

Figure 7C:
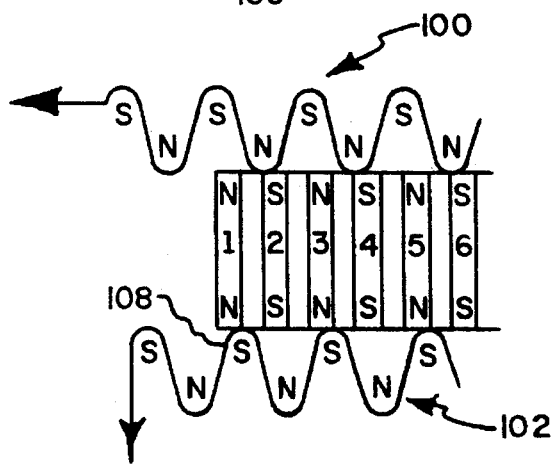

In FIG. 7C, the direction of current flow in coil section 100 remains the same as that shown in FIGS. 7A and 7B while the direction of current flow in coil section 102 is opposite that shown in FIG. 7A. Thus, magnetic south fields are set up in the peaks of coil section 102 and magnetic north fields remain in the troughs of section 100. Then, the upper south poles of magnets 96.2, 96.4 and 96.6 are in a state of direct magnetic attraction with the magnetic north fields set up in the troughs of coil section 100, while the lower north poles of magnets 96.1, 96.3 and 96.5 are in a state of direct magnetic attraction with the magnetic south fields set up in the peaks of coil section 102. These attractive forces are of equal magnitude and opposite direction to thereby lock slide 94 in the position as shown in FIG. 7C. Reference magnet 96.1 has now moved to the right 45 degrees and is aligned with the 225 degrees position, as indicated by point 108, along the frequency of coil section 102.

To return slide 94 to the position shown in FIG. 7B, it is necessary to discontinue current flow in coil section 102 to thereby reestablish the current flow scheme of FIG. 7B. This causes slide 94 to move 45 degrees to the left along the frequency of coil sections 100, 102 to thereby align with the 180 degree position of coil 102, indicated by point 106.

Figure 7D:
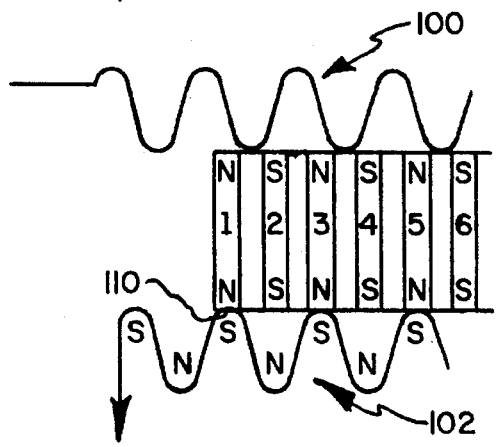
Figure 7E:
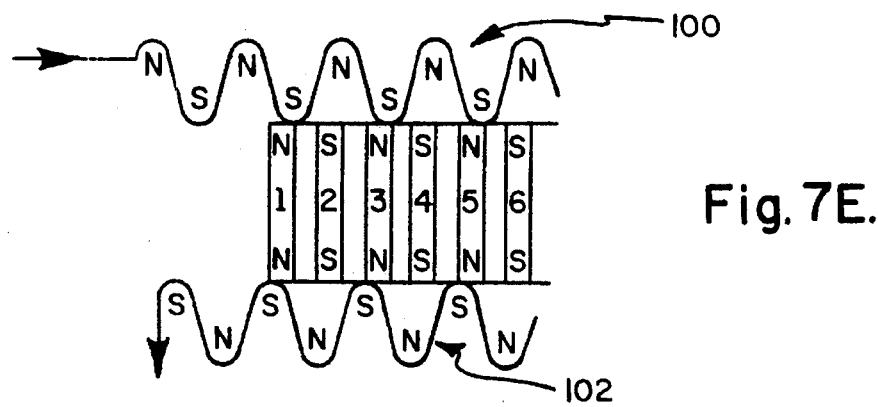
Figure 7F:
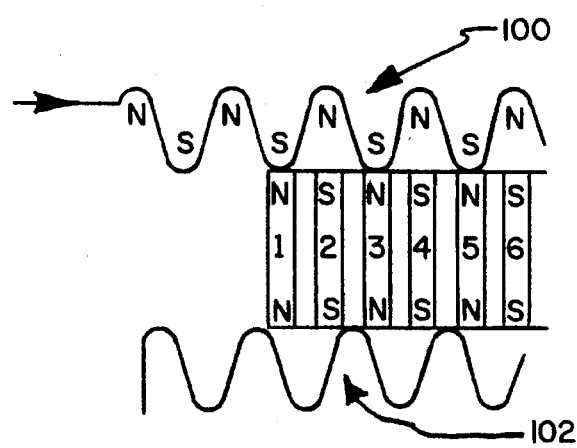
Figure 7G:
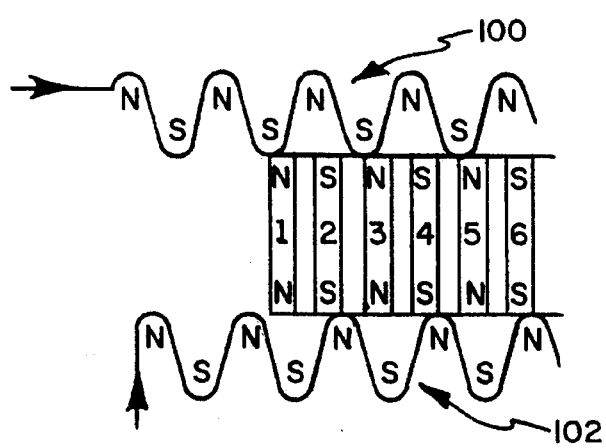
Figure 7H:
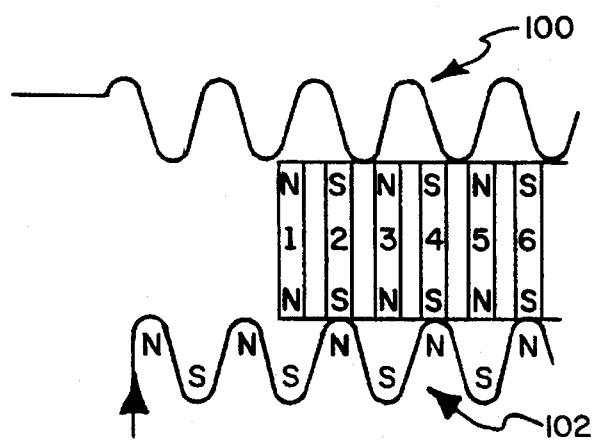

In FIG. 7D, there is no current flow in coil section 100 and the current flow in section 102 is in a similar direction as that shown in FIG. 7C. Thus, the lower north poles of magnets 96.1, 96.3 and 96.5 are in direct magnetic attraction with the magnetic south fields set up in the peaks of coil section 102. With this configuration, slide 94 has moved towards the right another 45 degrees such that reference magnet 96.1 is now aligned with the 270 degrees position, as indicated by point 110, along the frequency of the coil section 102.

To return slide 94 to the position shown in FIG. 7C, it is necessary to reestablish current flow in coil section 100 to again match the current scheme shown in FIG. 7C. This causes slide 94 to move 45 degrees to the left along the frequency of coil sections 100, 102 to thereby align with the 225 degree position of coil 102, indicated by point 108.

This manipulation of the current flow through coil sections 100 and 102 is continued as shown in FIGS. 7E to 7H to thereby move the slide 94 at 45 degree increments towards the right along the track set up between coil sections 100 and 102. Of course, slide 94 can be moved towards the left by reestablishing the current flow scheme in any one figure to that which is shown in the previous figure. Thus, leftward movement for slide 94 is obtained by reversing the energization sequence of coils 100, 102 from that shown in FIG. 7H sequentially back to that shown in FIG. 7A.

The linear arrangement of FIGS. 7A to 7H also would include energizer means (not shown) and computer means (not shown) operatively associated with stator coil sections 100, 102 and functioning in a manner similar to that of the energizer means and computer means in the embodiment of FIGS. 1 to 6.

Thus, it can be seen that the electromagnetic drive means of the present invention in both its rotary and linear embodiments is useful for operating an indicator device employed as a gauge means for indicating the magnitude of a measurement in both angularly rotatable devices and linearly movable mechanisms. In particular, the rotatable indicator means 12 are useful as gauges and meters in a display panel, such as the kind typically included in an automobile dashboard and the like. Slide 94 and associated coil section 100 and 102 are similarly useful for linear actuated gauges and meters, for example, of the kind used in a display panel.

While the present invention has been particularly described in connection with certain specific embodiments thereof, it is to be understood that this is by way of illustration and not of limitation, and the scope of the appended claims should be construed as broadly as the prior art will permit.

What is claimed is:

1. Electromagnetic drive means for converting input electric current to output motion comprising:

a) stator means comprising a plurality of discrete coil means arranged so as to provide a travel path consisting of one of the group of annular movement, linear movement and movement having both annular and linear components, wherein each of the coil means extends in a sinuous configuration between leads at each end of each of the coil means to thereby provide alternating peaks and troughs at respective half cycle apexes of the sinusoid such that the peaks and troughs are 180° out of phase;

b) motive means for carrying a plurality of discrete magnet means spaced at intervals along the motive means, wherein the magnet means are arranged such that north and south magnetic poles alternate along the motive means;

c) energizer means for selectively supplying electrical current to at least one of the plurality of discrete coil means of the stator means to thereby create alternating and 180° out of phase north and south magnetic fields in either the peaks and troughs of the energized coil means, wherein the motive means is movable along the travel path in response to magnetic attraction and repulsion forces set up between the magnet means of the motive means and the alternating magnetic fields provided by the energized peaks and troughs of the coil means of the stator means; and d) driver means which selectively regulates the energization of the coil means and a direction and magnitude of the current flow supplied to the at least one coil means in response to a control input wherein the relationship of the direction and magnitude of the current flow in the at least one coil means is determinative of the magnetic attraction and repulsion forces established between the magnet means and the energized coil means in response to change in control input supplied to the driver means and wherein coordination of the sequencing of the energization and the change in the direction and magnitude of the current flow in the at least one coil means causes appropriate change in the magnetic attraction and repulsion forces established between the coil means of the stator means and the magnet means of the motive means to effect incremental movement of the motive means along the travel path to thereby indicate a relative value of the control input.

2. The electromagnetic drive means of claim 1 for operating an indicator means for registering the relative value of the control input, wherein the control input is from an external source and wherein the movement of the motive means is indicative of the relative value of the control input supplied to the control means by the external source.

3. The electromagnetic drive means of claim 1 wherein intensifier means are positioned in a proximate and centered relationship with respect to the apex of the peaks and troughs of the wind section of the plurality of coil section to concentrate the alternating north and south magnetic fields set up in each of the wind sections at the apex thereof.

4. Electromagnetic drive means for converting input electric current to output motion comprising:

a) stator means comprising a plurality of discrete coil means arranged in a circular configuration to form an annular travel path, wherein each of the coil means extends in a sinuous configuration between leads at each end of each of the coil means to thereby provide alternating peaks and troughs at respective half cycle apexes of the sinusoid such that the peaks and troughs are 180° out of phase;

b) rotor means having a disc shape and provided with a plurality of discrete magnet means spaced at intervals around the disc, wherein the magnet means are arranged such that north and south magnetic poles alternate around the rotor means;

c) energizer means for selectively supplying electrical current to at least one of the plurality of discrete coil means of the stator means to thereby create alternating and 180° out of phase north and south magnetic fields in either the peaks and troughs of the energized coil means, wherein the rotor means is rotatable around the annular travel path in response to magnetic attraction and repulsion forces set up between the magnet means of the rotor means and the alternating magnetic fields provided by the energized peaks and troughs of the at least one coil means of the stator means; and d) driver means which selectively regulates the energization of the coil means and a direction and magnitude of the current flow supplied to the coil means in response to a control input wherein the relationship of the direction and magnitude of the current flow in the at least one coil means is determinative of the magnetic attraction and repulsion forces established between the magnet means and the at least one energized coil means in response to change in control input supplied to the driver means and wherein coordination of the sequencing of the energization and the change in the direction and magnitude of the current flow in the at least one coil means causes appropriate change in the magnetic attraction and repulsion forces established between the coil means of the stator means and the magnet means of the motive means to effect incremental rotational movement of the rotor means to indicate a relative value of the control input.

5. The electromagnetic drive means of claim 4 for operating an indicator means for registering the relative value of the control input received from an external source.

6. The electromagnetic drive means of claim 5 provided in a control panel and including a housing means provided with an indentation that receives the indicator means, the indentation formed by a surrounding side wall that extends to and joins with a bottom wall and wherein each of the coil means extends in a sinuous configuration between its leads and around a portion of either a periphery of the surrounding side wall or the bottom wall of the indentation, or a combination thereof, and wherein the rotor means is fixedly mounted on a shaft means having a distal end rotatably received in an opening in the bottom wall in the indentation for rotational movement of the rotor means around the annular travel path and about a first longitudinal axis of the shaft means by appropriate change in the magnetic attraction and repulsion forces established between the stator means and the magnet means of the rotor means and wherein a portion of the housing means adjacent to the indentation is provided with graduated indicia and wherein a proximate end of the shaft means supports a pointer means that is movable with respect to the graduated indicia in response to the magnetic attraction and repulsive forces set up between the magnet means and the coil means to thereby indicate the relative value of the control input from the control means, wherein the shaft means provides an optical coupling with a lamp means for illumination of the shaft means and wherein the shaft means and pointer means are composed of a light transmitting material.

7. The electromagnetic drive means of claim 5 further including a housing means that supports the indicator means.

8. The electromagnetic drive means of claim 7 wherein the coil means are composed of a conductive material that is either embedded or topically applied to the housing means.

9. The electromagnetic drive means of claim 7 wherein the housing means is provided with an indentation formed by a surrounding side wall that extends to and joins with a bottom wall and wherein each of the coil means extends in the sinuous configuration between its leads and around a portion of either a first periphery of the surrounding side wall or the bottom wall of the indentation, or a combination of them.

10. The electromagnetic drive means of claim 9 wherein the rotor means is fixedly mounted on a shaft having a distal end rotatably received in an opening in the bottom wall of the indentation for rotational movement of the rotor means around the annular travel path and about a first longitudinal axis of the shaft means by appropriate change in the magnetic attraction and repulsion forces established between the stator means and the magnet means of the rotor means.

11. The electromagnetic drive means of claim 10 wherein a portion of the housing means is provided with graduated indicia and wherein a proximate end of the shaft means supports a pointer means that is movable with respect to the graduated indicia in response to the magnetic attraction and repulsive forces set up between the magnet means and the coil means to thereby indicate the magnitude of the input.

12. The electromagnetic drive means of claim 10 wherein the shaft means provides an optical coupling for a lamp means for illumination of the shaft means and the associated pointer means.

13. The electromagnetic drive means of claim 12 wherein the shaft means and pointer means are composed of a light transmitting material.

14. The electromagnetic drive means of claim 10 wherein the side wall comprising the indentation has an annular shape and each of the coil means extends about an equal portion of the way around the annular extent of the indentation and wherein the proximate leads of adjacent coil means are spaced apart by an offset distance determined as a frequency between either adjacent peaks or adjacent troughs of each of the coil means divided by the number of coil means comprising the stator means.

15. The electromagnetic drive means of claim 14 wherein the rotational movement of the rotor means proceeds in increments which are proportionate to the frequency of the coil means.

16. The electromagnetic drive means of claim 10 wherein the side wall comprising the indentation has an annular shape and the magnet means of the rotor means each have opposed ends along respective second longitudinal axes disposed parallel with respect to the first longitudinal axis of the shaft means, and wherein each of the coil means extends in the sinuous configuration between its leads and around a portion of either a first periphery of the annular side wall or the bottom wall of the indentation, or a combination thereof such that at least either the peaks or the troughs of the coil sections are adjacent to one of the opposed magnet means to thereby provide the magnetic attraction and repulsion forces between the rotor means and the stator means when current is provided to the at least one coil means of the stator means.

17. The electromagnetic drive means of claim 4 wherein magnetic intensifier means are positioned in a proximate and centered relationship with respect to an apex of the peaks and troughs of the plurality of coil means to concentrate the alternating north and south magnetic fields set up at the apex thereof.

18. Electromagnetic drive means for converting input electric current to output motion comprising:
  a) stator means comprising a plurality of coil means arranged on opposite sides of an intermediate track provided therebetween, wherein each of the coil means extends in a sinuous configuration between leads at each end of each of the coil means to thereby provide alternating peaks and troughs at respective half cycle apexes of the sinusoid such that the peaks and troughs are 180° out of phase and displaced from a centerline of each of the coil means;
  b) slider means for carrying a plurality of discrete magnet means spaced at intervals along the slider means, wherein the magnet means are arranged such that north and south magnetic poles alternate along the slider means;
  c) energizer means for selectively supplying electrical current to at least one of the plurality of discrete coil means of the stator means to thereby create alternating and 180° out of phase north and south magnetic fields in either the peaks and troughs of the energized coil means, wherein the slider means is movable along the track formed between the coil means in response to magnetic attraction and repulsion forces set up between the magnet means of the slider means and the alternating magnetic fields provided by the energized peaks and troughs of the coil means of the stator means; and d) driver means which selectively regulates the energization and a direction and magnitude of the current flow supplied to the at least one coil means in response to a control input wherein the relationship of the direction and magnitude of the current flow in the at least one coil means is determinative of the magnetic attraction and repulsion forces established between the energized coil means and the magnet means and wherein coordination of the sequencing of the energization and the change in the direction and magnitude of the current flow in the at least one coil means in response to change in the control input supplied to the control means causes appropriate change in the magnetic attraction and repulsion forces established between the coil means of the stator means and the magnet means of the slider means to effect incremental movement of the slider means along the travel path to thereby indicate a relative value of the control input.

19. The electromagnetic drive means of claim 18 for operating an indicator means for registering a relative value of the control input received from an external source.

20. The electromagnetic drive means of claim 18 wherein the control input is from an associated measuring device and wherein the movement of the slider means is indicative of the relative value of the control input supplied to the driver means by the measuring device.

21. The electromagnetic drive means of claim 18 wherein the sinuous configuration of each of the coil means have a similar frequency.

22. The electromagnetic drive means of claim 18 wherein the sinuous configuration of each of the coil means have a similar frequency and the coil means on one side of the track are offset by a distance corresponding to a fraction of the frequency such that the alternating peaks and troughs of the coil means directly opposite each other on either side of the intermediate track do not line up but are out of phase by the offset distance.

23. The electromagnetic drive means of claim 18 wherein the slider means provides for mounting the plurality of magnet means and wherein the magnet means are spaced apart along the slider means a distance which is a multiple of a frequency between adjacent peaks or troughs of the coil means.

24. The electromagnetic drive means of claim 18 wherein the coil means on either side of the track are offset by a first distance corresponding to 90 degrees along a frequency between adjacent peaks or troughs of the coil means and wherein the slider means provides for mounting the plurality of magnet means, the magnet means being spaced apart along the slider means a second distance corresponding to 180 degrees along the frequency of the coil means.

25. In an indicator means for registering the magnitude of a measurement including electromagnetic drive means comprising operatively associated stator means and rotor means wherein energization of the stator means is controlled by a control means so that movement of the rotor means is indicative of the relative value of a measurement supplied to the control means from an external source, the improvement comprising:

a) housing means provided with an indentation that receives the indicator means, the indentation formed by a surrounding side wall that extends to and joins with a bottom wall wherein the stator means comprises a plurality of discrete coil means arranged in a circular configuration extending around a portion of at least either a periphery of the surrounding side wall or the bottom wall of the indentation or a combination of them and wherein each of the coil means extends in a sinuous configuration between leads at each end of each of the coil means to thereby provide alternating peaks and troughs at respective half cycle apexes of the sinusoid such that the peaks and troughs are 180° out of phase;

b) the rotor means having a disc shape and provided with a plurality of discrete magnet means spaced at intervals around the disc such that north and south magnetic poles alternate around the rotor means fixedly mounted on a shaft having a distal end rotatably received in an opening in the bottom wall of the indentation of the housing means for rotational movement of the rotor means about a longitudinal axis of the shaft means by appropriate magnetic interaction between the stator means and the magnet means of the rotor means;

c) a portion of the housing means adjacent to the indentation being provided with indicia that are graduated in such a manner so as to correspond to an intended range of measurements and wherein a proximate end of the shaft means supports a pointer means that is movable with respect to the graduated indicia in response to the magnetic interaction between the magnet means of the rotor means and the stator means to thereby indicate the magnitude of the measurement; and d) the shaft means being provided with an indentation inletted into the distal end thereof that serves to receive a lamp means for illumination of the shaft means and the associated pointer means.

26. The apparatus of claim 25 wherein the shaft means and pointer means are composed of a light transmitting material.

27. A method for converting input electrical current to output mechanical motion comprising:

a) providing a stator means comprising a plurality of separately electrically energizable sections of an electrically conductive material, each section having a sinuous configuration between leads at each end of each of the section thereby defining a plurality of alternating peaks and troughs at respective half cycle apexes of the sinusoid such that the peaks and troughs are 180° out of phase along a travel path provided by the stator means;

b) providing a motive means comprising a plurality of discrete magnetic means at spaced intervals along the motive means;

c) selectively supplying electric current to at least one of the sections of the stator means to thereby create alternating and 180° out of phase north and south magnetic fields in either the peaks and troughs of the energized sections;

d) controlling a direction and magnitude of current flow to each of the energized sections of the stator means; and e) coordinating the sequence of energizing the stator sections and the direction and magnitude of current flow therein to control the magnetic attractive and repulsive forces set up between the stator means and the motive means to cause movement of the motive means relative to the stator means.

* * * * *